Oct. 6, 1964  C. L. REICHERT ETAL  3,151,505
RADIAL DRILLING MACHINE AND COUNTERBALANCE THEREFOR
Filed Sept. 5, 1961  2 Sheets-Sheet 1
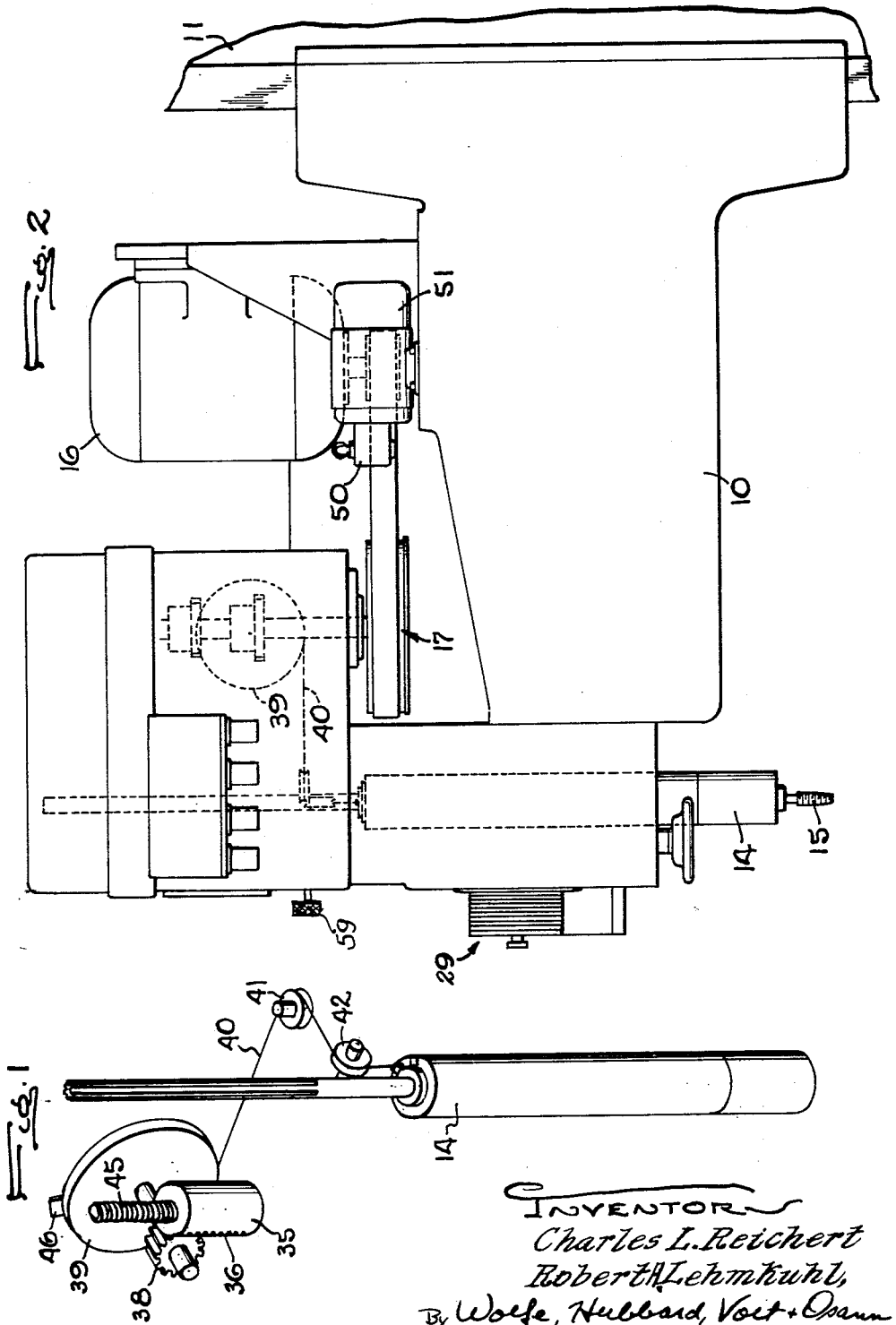
INVENTORS
Charles L. Reichert
Robert H. Lehmkuhl,
By Wolfe, Hubbard, Voit & Osann
ATTORNEYS

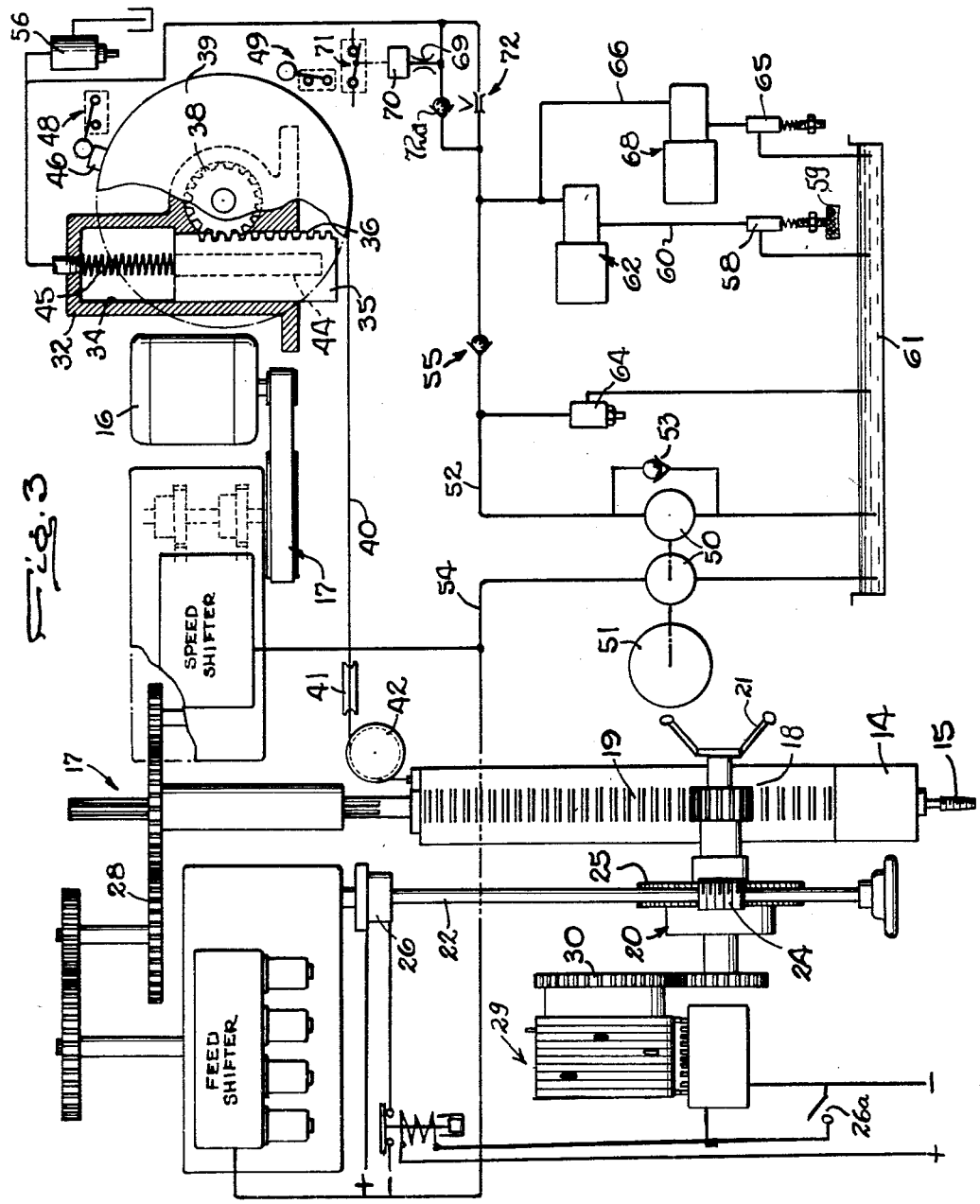

United States Patent Office 3,151,505
Patented Oct. 6, 1964

3,151,505
RADIAL DRILLING MACHINE AND
COUNTERBALANCE THEREFOR
Charles L. Reichert and Robert A. Lehmkuhl, Appleton, Wis., assignors to Gidding & Lewis Machine Tool Company, Fond du Lac, Wis., a corporation of Wisconsin
Filed Sept. 5, 1961, Ser. No. 136,703
13 Claims. (Cl. 77—36)

The present invention relates to radial drilling machines and more specifically to radial drilling machines of the type having a heavy vertical spindle.

One object of the present invention is to provide an improved hydraulic system for use with radial drilling and tapping machines of the above character.

Another object of the present invention is to provide an improved hydraulic counterbalance system for radial drilling and tapping machines which affords substantially improved operator feel during machine operation.

Another object of the present invention is to provide an inexpensive, versatile and dependable spindle traverse system for machines of the foregoing character. A more detailed object is to eliminate the necessity of employing special machine feeds or special tool holders to accomplish tapping operations.

A further object of the present invention is to provide a hydraulic system of the foregoing character adaptable for use in traversing as well as counterbalancing the machine spindle.

Still a further object of the present invention is to provide a hydraulic system by which the slow feed approach traverse of the tool on the workpiece can be eliminated or substantially reduced, so that the tool can be traversed directly into engagement with the workpiece.

Still another object of the present invention is to provide a spindle feed dwell to allow the spindle feed to be relaxed gradually at the end of a drilling or facing cycle.

Still another object of the present invention is to provide a spindle feed dwell of the foregoing character which reduces the shock to the machine frame and drive without necessitating that the machine be extremely heavy and rigid.

Other objects and advantages of the present invention will become apparent as the following description proceeds taken in connection with the accompanying drawings wherein:

FIGURE 1 is a perspective view of a radial drilling machine spindle traverse and counterbalance mechanism embodying the present invention.

FIG. 2 is an elevation view of a radial drilling machine arm and headstock embodying the present invention.

FIG. 3 is a schematic diagram illustrating a hydraulic system embodying the present invention.

While a certain illustrative embodiment of the invention has been shown in the drawings and will be described below in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

The invention is embodied in a radial drilling machine of the type having a horizontal arm 10 supported on a vertical column 11 and carrying for translation therealong a headstock journaling a rotatable and axially translatable vertical spindle 14 having a tool such as a drilling or tapping bit 15 in the lower end thereof. For rotating and feeding the spindle 14 there is provided a drive motor 16, operatively coupled to the spindle by an appropriate gear transmission indicated generally at 17 and of a type well known to those skilled in the art.

In the construction shown, for feeding the spindle there is provided a pinion gear 18 which meshes with a rack 19 on the spindle. A main power drive clutch 20 which may either be an electric clutch or a manual clutch, associated with a manually operated pilot wheel 21 is provided to connect the pinion gear 18 to the power feed transmission 17 (see, for example, U.S. Patent No. 1,688,547).

One illustrative spindle feed driving arrangement is shown in FIG. 3, and includes an output or drive shaft 22 carrying a worm gear 24 meshed with a worm wheel 25 operatively coupled to the clutch 20. The worm and worm wheel gearing described herein is of the self locking type so that axial thrust applied to the spindle 14 will not be released as long as the pinion 18 is clutched to the worm wheel 25 by the drive clutch 20. When the clutch 20 is disengaged, any thrust on the spindle will be immediately released through the pinion 18. Because of the extensive overhang of the headstock 12, it will be appreciated by those skilled in the art that such radial drills deflect a considerable amount when subjected to heavy thrust loads. This deflection occurs in the arm, the column, the feed drives and their associated connections. As a result, when termination of the spindle feed is obtained by disengagement of the drive clutch 20, there results an instantaneous release of the feed thrust and machine deflections. This causes a substantial shock to the machine frame and drive and accelerates wear and misalinement of the machine. This also results in false dial indicator readings and adversely affects the qualities of the machine.

In accordance with one aspect of the present invention the instantaneous release of feed thrust with the resultant shocks to the machine is substantially reduced or eliminated by provision in the drive shaft connection to the feed transmission of a dwell clutch means such as an electric jaw clutch 26. By disengaging the dwell clutch 26, the feed drive transmission is disengaged from the spindle 14 while retaining the spindle in a non-reversible condition. Under this condition the spindle will continue to rotate through the spindle speed gearing 28 for a short period while the residual thrust is dissipated by removal of additional metal in the cut. After the short dwell period, the main drive clutch 20 is disengaged without shock or strain to the machine. It will be appreciated that the operation of the auxiliary clutch 26 increases the machining accuracy and reduces shock and strain to the machine thereby improving machine performance.

If a magnetic dwell clutch is employed, it can be controlled by an appropriate switch 26a located on the electrical control station commonly provided for the machine. Control of the dwell clutch may also be accomplished by the use of automatic control mechanisms such as trip discs illustrated generally at 29 and coupled to the spindle drive through a gear train 30. As disclosed in the copending application of Garner H. Schurger et al., Serial No. 132,051, filed August 17, 1961, the trip discs 29 and associated controls may determine not only the extent of downward spindle travel before dwelling and reversal occur, but also the feed rate of the spindle.

Means are desirably provided to prevent the spindle from falling when the feed drive is disengaged. To provide such a counterbalance force such means as springs, weights, and pneumatic cylinders have heretofore been employed. For example, in one prior hydraulic counterbalance a servo system controlled by the spindle pilot wheel is employed. It was necessary for the operator to control the machine through this servo system with the resultant loss of operator feel. In order to provide an improved counterbalance system which reduces space requirements, servicing and costs and eliminates the undesirable features of prior devices, the present invention contemplates the provision of an improved hydraulic counterbalance means located on the headstock for applying a lifting force to counterbalance at least a portion of the weight of the spindle. One illustrative counterbalance means embodying the invention is shown in FIGS. 1 and 3 and comprises a hydraulic cylinder 32 fixed to the headstock and having a vertical bore 34 which is fitted with an elongated piston 35. The piston is operatively coupled to the spindle 14 by means of a rack gear 36 cut in the side of the piston which meshes with a pinion 38 journaled on the cylinder. The pinion is connected to a pulley or sheave 39 on which carries a cable 40 secured at one end to the spindle 14. The rack 36 is not cut through the upper end of the piston in order to provide the necessary hydraulic enclosure between the piston and the cylinder bore 34. One end of the counterbalance 40 is secured to the sheave 39 and the cable passes around a pair of pulleys 41, 42 (FIG. 1) and is engaged at its other end with the spindle 14 by a clamp (not shown).

In order to provide a constant force on the piston to maintain a tension on the cable 40 at all times, the piston is formed with a bore 44 in which is mounted a spring 45 acting between the piston and the cylinder 32. This spring exerts a constant force on the piston and it thereby tensions the cable even during shutdown when hydraulic pressure may not be supplied to cylinder 32.

Because the sheave 39 turns in timed relation to the translation of the spindle 14, safety limit means may be associated therewith. As here shown, the sheave 39 is provided with one or more dogs 46 adapted to engage and actuate limit switches 48 and 49 as the spindle reaches its respective travel limits. Such switches may be associated with well known controls to terminate spindle movement, and the switch 49 may, if desired, be connected to energize the dwell clutch 26 and thus stop spindle feed without allowing spindle back-up.

The counterbalance cylinder 32 is supplied with hydraulic counterbalance fluid from a pump 50 driven by an appropriate motor 51. The hydraulic pump 50 supplies pressure fluid to the counterbalance system through line 52 as well as to the various transmission shifter mechanism through line 54, and also to the lubrication system and other systems employed in the machine such as transmission gear detent devices (not shown). To prevent loss of counterbalance pressure whenever the pump is inoperative, there is provided a check valve 55 in the line 52. An overload relief valve 56 is provided which may be regulated to set a desired overload relief pressure.

In order to adjust the pressure applied to the counterbalance cylinder 32, there is provided a pressure control relief valve 58 which can be adjusted by an appropriate adjusting knob 59 to relieve the pressure in the line 52 by exhausting fluid through a line 60 to the oil sump 61. A solenoid valve 62 is provided in this line, for a purpose to be described, and when the counterbalance is set for manual operation, this valve 62 is open. For example, when the operator desires to adjust the counterbalance to his own liking he can adjust knob 59 to set the valve 58 to maintain the desired counterbalance pressure in the cylinder 32. By setting the system pressure to a level which is sufficient to balance the tool, the operator can retain a complete feel of the tool operation. With this system, the counterbalance does not interfere with the normal machine operation or operator feel, thereby increasing the accuracy of machining operations.

In the past it has been necessary to resort to special tool holders or other special built-in machine mechanisms to accomplish automatic cycle tapping operations. Some machines, for example, provide special change gears in the feed transmission to produce spindle feeds which are equivalent to the lead of the tap. Floating tool holders are sometimes used in situations where the tapping machine feed is not equal to the feed of the tap. In the latter case the float of the tool holder makes up the difference between the machine feed and the tap feed. It has also been common practice to change the spindle rapid traverse feed rate to a slow feed rate before the tool is engaged with the workpiece. Feed change is usually accomplished by trip mechanisms or other control means and this practice results in the tool cutting air at a slow feed rate for a short distance.

In the present invention means are provided for rapidly traversing the spindle tool until the tool engages the workpiece and then immediately stopping the traverse so that the tool is not damaged. This improved rapid traverse means enables an operator to rapidly traverse the tool to the workpiece and immediately begin a tapping operation, and at the same time, this means eliminates or reduces the necessity of employing special tapping equipment. One illustrative means for this purpose is shown in the drawings and embodies the hydraulic counterbalance system described above. To this end the pressure control relief valve 58, referred to as the balance relief valve, is adjusted to balance the spindle perfectly so that no traverse motion of the spindle occurs when the machine feed drive is declutched at the main clutch 20. In addition, a second pressure control relief valve 64 is provided between the pump output line 52 and the sump 61. This valve 64 is adjusted to maintain a pressure in line 52 and cylinder 32 which overbalances the spindle. The overbalance pressure is high enough to force the piston 35 downwardly and thereby raise or return the spindle 14.

In order to advance or lower the spindle, a third pressure control relief valve 65 is provided between the line 52 and the sump 61. The line to this control valve 65 is controlled by a spindle advance solenoid valve 68. The pressure control relief valve 65 is set to underbalance the spindle. That is, the underbalance relief valve 65 is set to maintain a low pressure in the line 52 which is below that pressure required to lift or balance the spindle 14. As a result, when the underbalance relief valve 65 is opened to the line 52, by opening underbalance solenoid valve 68, the pressure in line 52, and thereby in the cylinder 32, is not sufficient to counterbalance the spindle so that the force feeding a tool such as a tap held by the spindle is a fraction of the unbalanced weight of the spindle, and as a result the spindle drops or advances.

Adjustable orifice 72 is provided in line 52 to control the rate of downward advance. The rate of upward retraction is determined by the pump displacement through check valve 72a.

It will be readily observed by those skilled in the art that when solenoid valves 62 and 68 are closed, the overbalance relief valve 64 will control the pressure in the line 52 and cylinder 32, thereby overbalancing and returning the spindle. When balance valve 62 is opened, the balance relief valve 58 controls the pressure in line 52 and, as this control valve is set to maintain a pressure sufficient to balance the spindle, pressure fluid in the line 52 to the cylinder 32 will be maintained at just the pressure required to support the spindle and the tool it carries. Excess fluid from the pump 50 will, of course, be discharged to the sump through the relief valve 58. It will be appreciated that because this pressure is lower than the pressure setting of the overbalance valve 64, the balance pressure control relief valve 58 will determine the pressure in the line 52 to the cylinder.

When underbalance solenoid valve 68 is opened, underbalance relief valve 65 will then determine the pressure in the line 52. As this pressure is lower than that required to balance the spindle, the spindle will drop or advance. Underbalance relief valve 65 is desirably adjustable so that the advance pressure can be regulated to achieve the desired amount of spindle thrust. The various relief and solenoid valve constructions have not been described in detail. These valves are of a type well known in the art and their operation will be readily understood by those skilled in the art.

Means are provided for sensing the point at which the tool 15 engages the workpiece when the spindle is advancing or traversing the tool outwardly under the control of the underbalance relief valve 65. To this end, means such as a pressure switch 70 is provided for sensing the pressure in line 52 and for actuating a feed mechanism and closing the underbalance valve 65. It will be appreciated that when the tool 15 engages the workpiece, there will be an upwardly directed force on the spindle which will in turn reduce the tension in the cable 40 and thereby reduce the pressure in the cylinder 32. This will have the effect of reducing momentarily pressure in line 52, and this reduction in pressure is sensed by the pressure switch 70. By having the pressure switch 70 sufficiently sensitive and set for a low pressure reduction, it is possible to sense the point at which the tool 15 engages the workpiece by the drop in pressure in the counterbalance line with a high degree of accuracy. When this pressure drops a certain preselected amount, pressure switch 70 closes an electrical contact 71 which activates the spindle feed control circuit to engage the power feed, and to close the underbalance solenoid valve 68 and at the same time energize the balance solenoid valve 62 so that the spindle remains just balanced during the machining operation.

To prevent pressure fluctuations from actuating the pressure switch at undesired times and to insure that the pressure switch has an opportunity to sense a reduction in the pressure, an orifice restriction 69 is provided in the line between the pump 50 and the pressure switch 70.

At the end of a machining operation a limit switch on the trip disc 29 is actuated which deactivates the feed mechanism (clutch 20) and closes balance solenoid valve 62 so that the overbalance relief valve 64 determines the pressure in line 52 and the spindle is rapidly traversed inwardly to a full retracted position. The spindle is then ready for a subsequent cycle.

Tapping cycles require another mode sequence of operating the solenoid valves by trip disc control 29. For example, energizing underbalance solenoid valve 68 when the spindle is rotating in the right hand direction causes the spindle to advance until the tap engages the workpiece. At this point the rate of feed is determined by the lead of the tap. The tap continues to feed until a limit switch in control 29 is tripped causing the spindle rotation to be reversed and underbalance solenoid valve 68 to close. Overbalance valve 64 becomes effective to determine the pressure in line 52 causing the spindle to retract at a rate controlled by the lead of the tap until the tap disengages the hole. At that time the spindle is rapidly traversed inwardly under over-counterbalance pressure to a fully retracted position. The spindle is then ready for the next cycle.

An electrical circuit for carrying out the foregoing operations has not been disclosed as it is believed that any one skilled in the art can devise an appropriate circuit for this purpose. Tapping circuits, gear shifting circuits, and the like are, of course, well known in radial drills.

The counterbalancing system may be set to either balance the system during manual operation or be utilized for traversing the spindle as described above. When set for manual operation, solenoid valve 68 is closed and the pressure control relief valve controlled by solenoid 62 is set to the desired degree of balancing pressure.

We claim as our invention:

1. A machine tool having a vertical spindle mounted for longitudinal feed movement and carrying a tool, a mechanical drive for feeding said spindle, said drive including a main clutch, means for engaging and dispersing said main clutch, a hydraulic system for advancing, balancing and retracting said spindle comprising in combination a piston and cylinder unit, a pump for supplying pressure fluid to said piston and cylinder unit, means connecting said piston to said spindle, means for controlling supply of pressure fluid to said piston and cylinder to selectively advance, balance and retract said spindle, said controlling means including first pressure relief valve means set to overbalance said spindle, second pressure relief valve control means set to balance said spindle, and third pressure relief control valve means set to underbalance said spindle, and means including a pair of solenoid valves for selectively actuating said second and third relief valves and for engaging and disengaging said main clutch to selectively provide mechanical and hydraulic feed for said spindle.

2. In a machine tool including a spindle and a drive for feeding said spindle, said drive including a main clutch, a worm gear and a transmission for driving said worm gear and main clutch to feed said spindle, the combination comprising, an auxiliary clutch between said transmission and said worm gear for disengaging said drive without disengaging the main clutch and thereby releasing the drive force on said spindle, and a hydraulic feed means for feeding and retracting said spindle upon disengagement of said main clutch.

3. In a machine tool including a spindle and a drive for feeding said spindle, said drive including a clutch, a worm gear drive and a transmission for driving said worm gear and clutch to feed said spindle, the combination comprising, an auxiliary clutch between said transmission and said worm gear for disengaging said worm gear from the transmission without disengaging the main clutch, and a hydraulic feed means for feeding and retracting said spindle upon disengagement of said main clutch.

4. In a machine tool including a rotatable spindle carrying a tool, the combination comprising a rack and pinion for feeding said spindle, a worm gear wheel, a main clutch releasably engaging said worm gear wheel to said pinion, a worm gear for driving said worm wheel, a power driven feed gear transmission including a shaft for driving said worm gear, and a clutch operatively connecting said worm gear shaft to said transmission for disengaging said worm gear from said transmission without disengaging the main clutch and thereby releasing the drive force on said spindle, and a hydraulic feed means for feeding and retracting said spindle upon disengagement of said main clutch.

5. In a machine tool including a rotatable spindle carrying a tool, a rack and pinion for feeding said spindle, a worm gear wheel, a main clutch releasably engaging said worm gear wheel to said pinion, a worm gear for driving said worm wheel, a power driven feed gear transmission including a shaft for driving said worm gear and a prime mover for driving said gear transmission, the improvement comprising a clutch operatively connecting said worm gear shaft to said transmission for disengaging said worm gear from said transmission without disengaging the main clutch and thereby releasing the drive force on said spindle, and a hydraulic feed means for feeding and retracting said spindle upon disengagement of said main clutch.

6. In combination with a machine tool spindle and a worm gear drive for said spindle, said worm gear drive including a worm gear meshed with a worm wheel coupled to the spindle by a clutch, an auxiliary clutch for releasing the application of power to said worm gear independently of said worm wheel clutch, and a hydraulic feed means for feeding and retracting said spindle upon disengagement of said main clutch.

7. In a machine tool including a vertical rotary spindle mounted for longitudinal feed movement and adapted to receive taps, drills or like tools, the combination comprising, a mechanical drive for feeding said spindle downwardly toward a workpiece while rotating, said drive including a main clutch, means for disengaging said main clutch during tapping cycles so as to free said spindle from said mechanical drive whereby the weight of said spindle tends to feed a tap in said spindle downwardly into said workpiece, hydraulic counterbalancing means for said spindle operative upon disengagement of said main clutch to underbalance said spindle so that the downward force feeding said tap into said workpiece is a fraction of the unbalanced weight of said spindle whereby the lead of said tap determines the spindle feed rate, and means for reversing the rotation of said spindle upon said tap reaching a predetermined depth and for operating said counterbalancing means to overbalance said spindle to retract said tap from said workpiece at a rate determined by the tap lead.

8. In a machine tool including a vertical rotary spindle mounted for longitudinal feed movement and adapted to receive taps, drills or like tools, the combination comprising, a mechanical drive for feeding said spindle, said drive including a disengageable main clutch, hydraulic counterbalancing means for said spindle selectively operable to underbalance, balance, and overbalance said spindle, and means providing selectively a mechanical and hydraulic spindle feed including means for disengaging said clutch to free said spindle from said mechanical drive and for operating said counterbalancing means to underbalance said spindle whereby the unbalanced weight of said spindle tends to feed a tool held thereby downwardly into a workpiece, and means operating said counterbalancing means while said clutch is disengaged to overbalance and thereby retract said spindle.

9. In a machine tool including a vertical rotary spindle mounted for longitudinal feed movement and adapted to receive taps, drills or like tools, the combination comprising, a mechanical drive for feeding said spindle, said drive including a main clutch and a transmission for driving said main clutch to feed said spindle, said main clutch being disengageable during machining cycles so that the unbalanced weight of said spindle tends to feed a tool in said spindle, a hydraulic system for counterbalancing said spindle including a cylinder having a piston therein, means connecting said piston to said spindle, and means for controlling supply of pressure fluid to said cylinder, said controlling means including valve means for setting fluid pressure in said cylinder to selectively underbalance, balance and overbalance said spindle, fluid pressure at a point in said hydraulic system connected with said cylinder being determined by resistance to feed of said tool, means for actuating one of said valve means to underbalance said spindle and thereby hydraulically traverse said spindle downwardly toward said workpiece, means for sensing change in pressure at said point in said system responsive to change in feed resistance when the tool engages said workpiece and for actuating another of said valve means upon change in pressure to balance said spindle, and means responsive to said sensing means for engaging said main clutch to power feed said balanced spindle with said mechanical drive.

10. A machine tool having a vertically movable rotatable spindle carrying a tool, a hydraulic system for advancing, balancing and retracting said spindle comprising in combination a piston and cylinder unit, a pump for supplyig fluid to said piston and cylinder unit, means connecting said piston and cylinder unit to said spindle so that fluid pressure in said cylinder acting against said piston tends to oppose downward movement of said spindle, means for controlling said fluid pressure in said cylinder to selectively advance, balance and retract said spindle, said controlling means including first pressure relief valve means connected between said pump and said unit to control fluid pressure in the latter and being set to overbalance said spindle and thereby retracting the latter, second pressure relief valve control means connected between said pump and said unit to control fluid pressure in the latter and being set to balance said spindle, and third pressure relief control valve means connected between said pump and said unit to control fluid pressure in the latter and being set to underbalance said spindle and thereby advance said spindle, and means for selectively actuating one of said relief valves to control the operation of said spindle, said piston being movable relative to said cylinder upon vertical movement in either direction of said spindle with said second pressure relief valve control means actuated.

11. A machine tool having a vertically movable rotatable spindle carrying a tool for machining a workpiece, a hydraulic system for advancing, balancing and retracting said spindle with respect to said workpiece, in combination, a piston and cylinder unit, a pump for supplying pressure fluid to said piston and cylinder unit, means connecting said piston and cylinder unit to said spindle so that fluid pressure in said cylinder acting against said piston tends to oppose downward movement of said spindle, means for controlling said fluid pressure in said cylinder to selectively advance, balance and retract said spindle, said controlling means including first pressure relief valve means connected between said pump and said unit to control fluid pressure in the latter and being set to overbalance said spindle and thereby retracting the latter, a second pressure relief valve means connected between said pump and said unit to control fluid pressure in the latter and being set to balance said spindle, and third pressure relief valve means connected between said pump and said unit to control fluid pressure in the latter and being set to underbalance said spindle and thereby advance said spindle, means for selectively actuating one of said relief valves to control the operation of said spindle, said piston being movable relative to said cylinder upon vertical movement in either direction of said spindle with said second pressure relief valve control means actuated, and means responsive to engagement of the tool with a workpiece for sensing the resultant decrease in fluid pressure to said piston and cylinder unit for de-energizing said third pressure relief valve means.

12. A machine tool having a vertically movable spindle carrying a tool for downward movement into engagement with a workpiece, a counterbalance system for balancing said spindle and for traversing or retracting said spindle by underbalancing or overbalancing the latter, a mechanical power feed drive adapted to be connected to feed said spindle, and cycle control means for operating said counterbalance system to underbalance and thereby traverse said spindle until said tool engages a workpiece, to balance said spindle responsive to such engagement, and for selectively connecting said mechanical power feed drive to said spindle responsive to such engagement so as to power feed said tool while engaged with said workpiece.

13. A machine tool according to claim 12, the counterbalance system including a piston and cylinder unit, means connecting said piston and cylinder unit to said spindle, and a source of pressure fluid connected to said cylinder with the fluid pressure in said cylinder acting against said piston to oppose downward movement of said spindle due to the unbalanced weight thereof or by overbalancing to retract said spindle.

References Cited in the file of this patent
UNITED STATES PATENTS

| | | |
|---|---|---|
| 1,601,113 | Fernstrom | Sept. 28, 1926 |
| 1,759,543 | Cole | May 20, 1930 |
| 2,854,869 | Hirvonen | Oct. 7, 1958 |
| 2,899,869 | Daugherty | Aug. 18, 1959 |
| 2,969,698 | Carlstedt | Jan. 31, 1961 |